United States Patent
Qi et al.

(10) Patent No.: US 9,678,557 B2
(45) Date of Patent: Jun. 13, 2017

(54) ELECTRICITY SAVING METHOD FOR USB DATA TRANSMISSION SYSTEM AND HOST DEVICE

(71) Applicant: ZTE CORPORATION, Shenzhen, Guangdong Province (CN)

(72) Inventors: Hongfang Qi, Shenzhen (CN); Jinlei Wu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 134 days.

(21) Appl. No.: 14/434,880

(22) PCT Filed: Jul. 3, 2013

(86) PCT No.: PCT/CN2013/078737
§ 371 (c)(1),
(2) Date: Apr. 10, 2015

(87) PCT Pub. No.: WO2013/178128
PCT Pub. Date: Dec. 5, 2013

(65) Prior Publication Data
US 2015/0286264 A1    Oct. 8, 2015

(30) Foreign Application Priority Data

Aug. 30, 2012 (CN) .......................... 2012 1 0314206

(51) Int. Cl.
*G06F 1/32* (2006.01)
(52) U.S. Cl.
CPC .......... *G06F 1/3215* (2013.01); *G06F 1/3253* (2013.01); *G06F 1/3278* (2013.01); *Y02B 60/126* (2013.01)

(58) Field of Classification Search
CPC ..... G06F 1/3215; G06F 1/3253; G06F 1/3278
See application file for complete search history.

(56) References Cited

U.S. PATENT DOCUMENTS

| | | | |
|---|---|---|---|
| 6,105,097 A | 8/2000 | Larky et al. | |
| 6,816,976 B2 * | 11/2004 | Wright | G06F 1/3203 713/322 |

(Continued)

FOREIGN PATENT DOCUMENTS

| | | |
|---|---|---|
| CN | 101630191 A | 1/2010 |
| CN | 102547935 A | 7/2012 |
| TW | 201234382 A1 | 8/2012 |

*Primary Examiner* — Stefan Stoynov
(74) *Attorney, Agent, or Firm* — Ling Wu; Stephen Yang; Ling and Yang Intellectual Property

(57) ABSTRACT

An electricity saving method and apparatus for a USB data transmission system are provided, wherein the USB data transmission system includes a USB device and a host device which performs data transmission by using a mass storage protocol with the USB device. The above-mentioned method includes: a host device detecting a detection instruction sent by the host device to a USB device, wherein the detection instruction is used for detecting whether the USB device has already been connected to the host device; in a situation that the detection instruction is detected and there is no specified data transmission between the host device and USB device, the host device replacing the USB device to analyze and respond to the detection instruction; when a duration during which there is no data transmission between the host device and USB device exceeds a predetermined duration, the host device notifying the USB device to suspend.

13 Claims, 4 Drawing Sheets

(56) References Cited

U.S. PATENT DOCUMENTS

| | | | |
|---|---|---|---|
| 8,473,647 B2* | 6/2013 | Vidal | G06F 1/3203 370/311 |
| 2013/0031283 A1* | 1/2013 | Tsuji | G06F 13/4282 710/33 |

* cited by examiner

ELECTRICITY SAVING METHOD FOR USB DATA TRANSMISSION SYSTEM AND HOST DEVICE

TECHNICAL FIELD

The present document relates to the communication field, and in particular, to an electricity saving method for a universal serial BUS (abbreviated as USB) data transmission system and a host device.

BACKGROUND OF THE RELATED ART

With the development of the wireless network technology, the application of the wireless network in people's life is more and more extensive. The wireless internet access of the laptop has already become a trend, but the coverage of the wireless fidelity (abbreviated as WiFi) hotspot is too low and limits the space of wireless internet access of the laptop to a certain extent. The data card adopting the 3rd generation (abbreviated as 3G) network can remedy the defect to a great extent, and the data card makes people perform the online entertainment and even the online working freely at the places without the WiFi hotspot, such as, the bus, the hotel, even the open country, etc. But in the environment where there is no active power and only the battery-power can be used, the power consumption of the data card (that is, the wireless internet access data card) is a huge challenge for the standby time of the laptop, and therefore how to reduce the power consumption of the data card device to the greatest extent becomes a problem urgently to be solved.

The number of modules of the data card which can save electricity is originally few and the space of the electricity saving was not big, and the USB, as the essential part, can achieve the electricity saving, which will reduce the power consumption of the data card to a certain extent and lengthen the standby time of the laptop as well.

After the data card is inserted into the laptop, besides virtualizing the COM port used for the user to access the internet, it also will virtualize the CDROM with the important file, such as, the internet access software and the device driver which is necessary for the user to use the data card, etc., for using by the user. The USB protocol stipulates that, when the USB bus is idle, that is, there is not any signal, the host will initiate the Suspend signal voluntarily after 3 ms, to notify the USB controller at the card side to enter the suspend state, thus reducing the power consumption of the device. But the Mass Storage protocol stipulates that the host will constantly send the device detection instruction, to require the device to perform responding. In this way, the USB bus will generate the signals all the time, and the USB is unable to enter the suspend mode, which cannot achieve the effect of the electricity saving. FIG. 1 shows the process of the interaction between the data card with the CDROM and the personal computer (abbreviated as PC) in the related art.

In step S102, the data card is inserted into the PC.

In step S104, the PC enumerates the CDROM, and installs the corresponding drivers and the internet access software at PC side automatically; the user pops up the CDROM manually, and the PC enumerates the CDROM and the COM port again.

In step S106, the PC sends the Test Unit Ready command (even if there is no network data transmission) to the Device constantly according to the enumerated CDROM (USB Mass Storage) device.

In step S108, the software at PC side does not intervene to the interaction of the PC and the Device in that process.

In step S110 and step S112, the Device responds to the PC, and there is the data transmission all the time in the USB bus.

In step S114, the UEB does not enter the Suspend, and because there is the data transmission in the USB bus, the PC does not generate the USB Suspend, and the USB does not enter the power saving mode.

So, how to solve the contradiction between the two becomes a key problem to solve that the USB can enter the suspend state when there is the read-only memory (CDROM).

The effective solution has not been put forward yet at present aiming at the above-mentioned problem in the related art.

SUMMARY OF THE INVENTION

Aiming at the technical problems that the USB device is unable to suspend which is caused by the host device sending the detection instruction to the USB device continuously and then the system power consumption is wasted, etc., in the related art, the present document provides an electricity saving method for a universal serial BUS (USB) data transmission system, to solve the above-mentioned problems at least.

According to one aspect of the embodiment of the present invention, an electricity saving method for a USB data transmission system is provided, wherein the USB data transmission system comprises: a USB device and a host device which performs data transmission by using a mass storage protocol with the USB device; and the method comprises: the host device detecting a detection instruction sent by the host device to the USB device, wherein the detection instruction is used for detecting whether the USB device has already been connected to the host device; in a situation that the detection instruction is detected and there is no specified data transmission between the host device and the USB device, the host device replacing the USB device to analyze and respond to the detection instruction; and when a duration during which there is no data transmission between the host device and the USB device exceeds a predetermined duration, the host device notifying the USB device to suspend.

The host device replaces the USB device to analyze and respond to the detection instruction, comprising: the host device analyzing and responding to the detection instruction through a driver program of the USB device.

The above-mentioned method further comprises: when detecting that there are data to be transmitted between the host device and the USB device, the host device sending a wakeup instruction to the USB device, wherein the wakeup instruction is used for notifying the USB device to recover the data transmission between the USB device and the host device.

The above-mentioned specified data are any data different from the detection instruction.

The above-mentioned USB device is one of the following: a wireless internet access data card with a read-only memory (CDROM) and a USB storage.

According to another aspect of the embodiment of the present invention, a host device is provided, wherein the hose device performs data transmission by using a mass storage protocol with a universal serial BUS (USB) device, and the hose device comprises: a detection module, configured to: detect a detection instruction sent by the host device to the USB device, wherein the detection instruction is used for detecting whether the USB device has already been connected to the host device; a response module, configured to: in a situation that the detection instruction is detected and there is no specified data transmission between the host device and the USB device, replace the USB device to analyze and respond to the detection instruction; and a notification module, configured to: when a duration during which there is no data transmission between the host device and the USB device exceeds a predetermined duration, notify the USB device to suspend.

The above-mentioned response module is configured to: analyze and respond to the detection instruction through a driver program of the USB device.

The above-mentioned apparatus further comprises: a transmitting module, configured to: when the response module detects that there are data to be transmitted between the host device and the USB device, send a wakeup instruction to the USB device, wherein the wakeup instruction is used for notifying the USB device to recover the data transmission between the USB device and the host device;

the above-mentioned response module is further configured to: notify the transmitting module to send the wakeup instruction to the USB device when detecting that there are data to be transmitted between the host device and the USB device.

The above-mentioned response module is configured to: in a situation that the specified data are any data different from the detection instruction, replace the USB device to analyze and respond to the detection instruction.

The above-mentioned apparatus is applied in a situation that the USB device is one of the following: a wireless internet access data card with a read-only memory CDROM, and a USB storage.

Through the embodiment of the present invention, the technical means, that the host device replaces the USB device to analyze and respond to the detection instruction when the detection instruction used for indicating whether the USB device has already been connected to the host device is detected, is adopted, which solves the technical problems that in the related art, the USB device is unable to suspend which is caused by the host device sending the detection instruction to the USB device continuously and then the system power consumption is wasted, etc., and therefore saves the power consumption of the USB device, thus reducing the power consumption of the USB data transmission system; and the realization is simple and easy to be popularized.

BRIEF DESCRIPTION OF DRAWINGS

The drawings described herein are used to provide a further understanding of the patent document and they constitute a part of the patent document, and the illustrative embodiments and description thereof are used to explain the patent document and not to constitute a improper limitation for the patent document. In the drawings.

PREFERRED EMBODIMENTS OF THE PRESENT INVENTION

The patent document is described in detail in conjunction with embodiments with reference to the accompanying drawings hereinafter. It should be illustrated that, in the case of not conflicting, the embodiments in the present application and features in these embodiments can be combined with each other.

Considering the technical problems that, in the related art, the USB device is caused to be unable to suspend because the host device sends the detection instruction to the USB device continuously, and then the system power consumption is wasted, etc., the relevant solution is provided in conjunction with the embodiment 1-2 as follows, which is explained in detail now.

Embodiment 1

Figure 1:
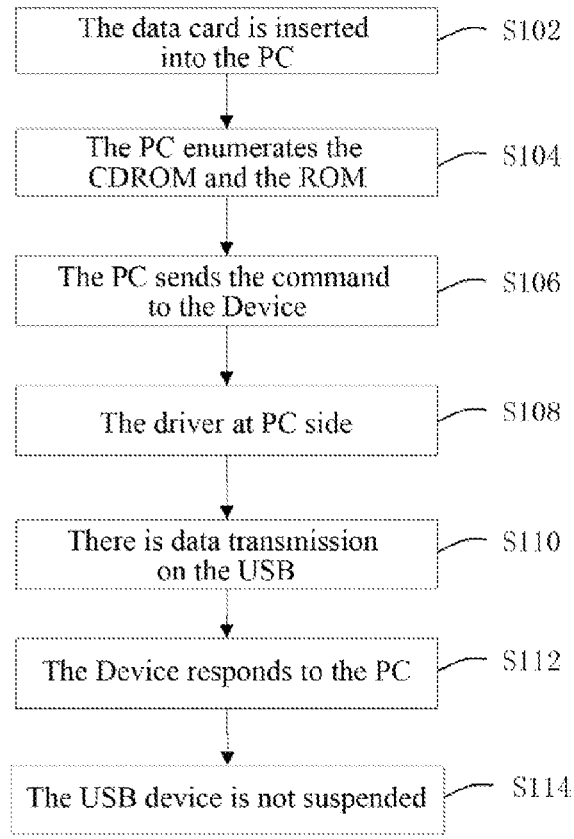
FIG. 1 is a process diagram of an interaction between a personal computer and a USB device according to the related art.
Figure 2:
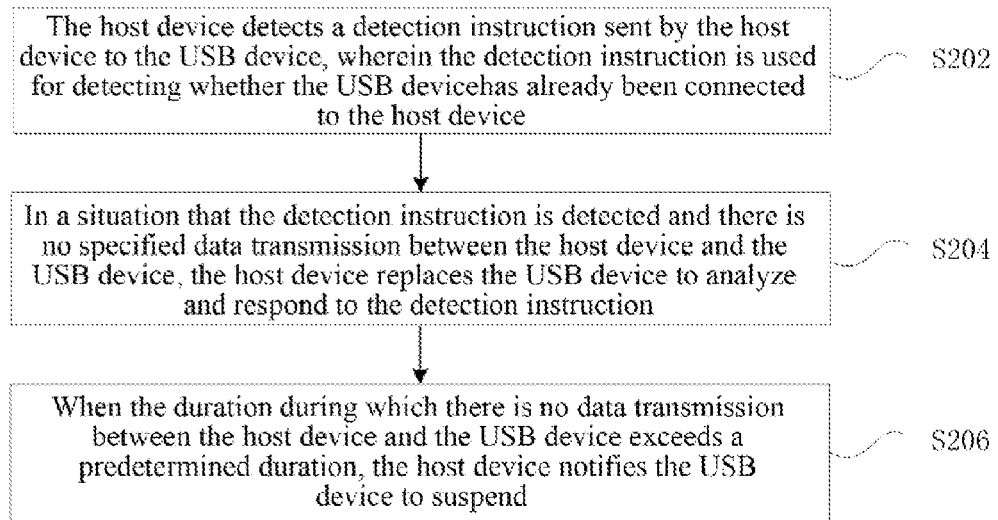
FIG. 2 is a flow chart of an electricity saving method for a USB data transmission system according to embodiment one of the present invention.

FIG. 2 is a flow chart of an electricity saving method for a USB data transmission system according to embodiment one of the present invention. In the present embodiment, the USB data transmission system includes: a USB device and a host device which performs data transmission by using a mass storage protocol with the USB device; as shown in FIG. 1, the above-mentioned method includes the following steps.

In step S202, the host device detects a detection instruction sent by the host device to the USB device, wherein the detection instruction is used for detecting whether the USB device has already been connected to the host device; during the specific implementation, the USB device can be a wireless internet access data card, and at this moment, the above-mentioned detection instruction can be: a Test Unit Ready instruction.

In step S204, in a situation that the detection instruction is detected and there is no specified data transmission between the host device and the USB device, the host device replaces the USB device to analyze and respond to the detection instruction; in this way, the power saving in a situation of not influencing the normal data transmission is realized.

In step S206, when the duration during which there is no data transmission between the host device and the USB device exceeds a predetermined duration, the host device notifies the USB device to suspend. During the specific implementation, the host device can notify the USB device to suspend through, but not limited to, the USB controller on the host device.

Through the above-mentioned processing steps, the host device replaces the USB device to analyze and respond to the detection instruction when the detection instruction used for indicating whether the USB device has already been connected to the host device is detected, therefore, the technical problems that the USB device is unable to suspend which is caused by the host device sending the detection instruction to the USB device continuously and then the system power consumption is wasted, etc., can be solved and the power consumption of the USB data transmission system is reduced.

In step S204, that is, there are multiple types of the realization methods that the host device replaces the USB device to analyze and respond to the detection instruction, for example, it can be realized through the independent third party program, and also the analyzing and responding can be performed on the detection instruction through the driver program of the USB device; as to the latter, it can be realized by adding the new USB power-saving function in the above-mentioned driver program; in this way, it is realized to reduce the power consumption of system in the situation that there is no user participation and there is no need to change the software and hardware environment of the USB device.

In order to avoid influencing the normal data transmission caused by the host device replacing the terminal device to respond to the detection instruction all the time, when detecting that there are data to be transmitted between the host device and the USB device, the host device sends a wakeup instruction to the USB device, wherein the wakeup instruction is used for notifying the USB device to recover the data transmission between the USB device and the host device. In the present embodiment, the wakeup procedure can be, but not limited to be initiated by the USB controller of the PC. When there is the data transmission (or the operation to USB) in the USB bus in the PC, the host controller will automatically send the resume instruction to wake up the USB device.

The above-mentioned specified data can be designated or set by the users according to the demand, and it can be any data different from the detection instruction and also can be all data except the above-mentioned detection instruction.

In the present embodiment, the USB device can be the wireless internet access data card with the CDROM or the USB storage, but it is not limited herein.

Figure 3:
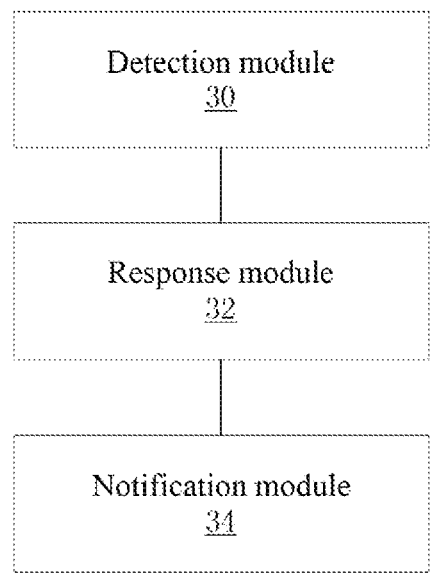
FIG. 3 is a structural block diagram of a host device according to embodiment one of the present invention.

The present embodiment further provides a host device, wherein the host device performs data transmission by using a mass storage protocol with a universal serial BUS (USB) device. The host device is used for realizing the above-mentioned embodiment and preferable embodiments, and those already explained ones will not go into details again. The modules involved in the host device are explained as follows. As used in the following, the term "module" can be a combination of the software and/or hardware for realizing the predetermined function. Although the apparatus described in the following embodiment is realized with the software preferably, the realization of the hardware or combination of the software and the hardware may also be possible and conceived. FIG. 3 is a structural block diagram of a host device according to embodiment one of the present invention. As shown in FIG. 3, the host device includes:

a detection module 30, connected to a response module 32 and configured to: detect a detection instruction sent by the host device to the USB device, wherein the detection instruction is used for detecting whether the USB device has already been connected to the host device;

the response module 32, connected to a notification module 34 and configured to: in a situation that the detection instruction is detected and there is no specified data transmission between the host device and the USB device, replace the USB device to analyze and respond to the detection instruction; and the notification module 34, configured to: when a duration during which there is no data transmission between the host device and the USB device exceeds a predetermined duration, notify the USB device to suspend.

Through the functions realized by each above-mentioned processing module, the host device also can replace the USB device to analyze and respond to the detection instruction when the detection instruction used for indicating whether the USB device has already been connected to the host device is detected, therefore, the technical problems that the USB device is unable to suspend which is caused by the host device sending the detection instruction to the USB device continuously and then the system power consumption is wasted, etc., can be solved and the power consumption of the USB data transmission system is reduced.

In the present embodiment, the above-mentioned response module 32 is configured to: analyze and respond to the detection instruction through a driver program of the USB device.

Figure 4:
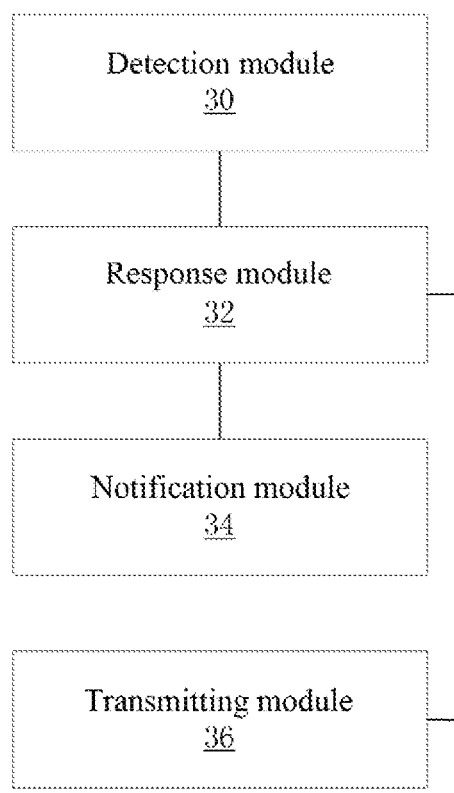
FIG. 4 is another structural block diagram of a host device according to embodiment one of the present invention.

In the present embodiment, as shown in FIG. 4, the above-mentioned host device can further include: a transmitting module 34, connected to the response module 32 and configured to: when the response module detects that there are data to be transmitted between the host device and the USB device, send a wakeup instruction to the USB device, wherein the wakeup instruction is used for notifying the USB device to recover the data transmission between the USB device and the host device. The above-mentioned response module 32 is further configured to: notify the transmitting module to send the wakeup instruction to the USB device when detecting that there are data to be transmitted between the host device and the USB device.

In the present embodiment, similar to the above-mentioned method, the above-mentioned response module 32 is configured to: in a situation that the specified data are any data different from the detection instruction, replace the USB device to analyze and respond to the detection instruction.

The above-mentioned USB device can be one of the following: a wireless interne access data card with a read-only memory CDROM, and a USB storage.

In order to understand the above-mentioned embodiment better, it is explained in detail by combining the embodiment 2 hereinafter.

Embodiment 2

The main purpose of the present embodiment lies in that, under the situation of keeping the CDROM existing, the problem that the USB is unable to enter the suspend mode and the power-saving effect cannot be achieved is solved. In the present embodiment, in the USB bus, when there is no data transmission in the COM channel, as to the detection (Test Unit Ready) command sent by the host to the CDROM device, the driver software at PC side, which is installed automatically when the data card is inserted, performs the response according to the Mass Storage protocol. When there is no signal in the USB bus, the idle state is entered, thus the usb controller at card side enters the suspend state, and the data card enters the sleeping mode to achieve the power-saving effect. When the COM port needs to perform the data transmission, the usb controller of the host will send the resum signal to wake up the USB controller, and at this moment, the driver software at PC side will no longer process the device detection command and transfer it to the device for processing. The technical means can realize the USB system power-saving of the data card with the CDROM on the premise of not influencing the normal service.

Figure 5:
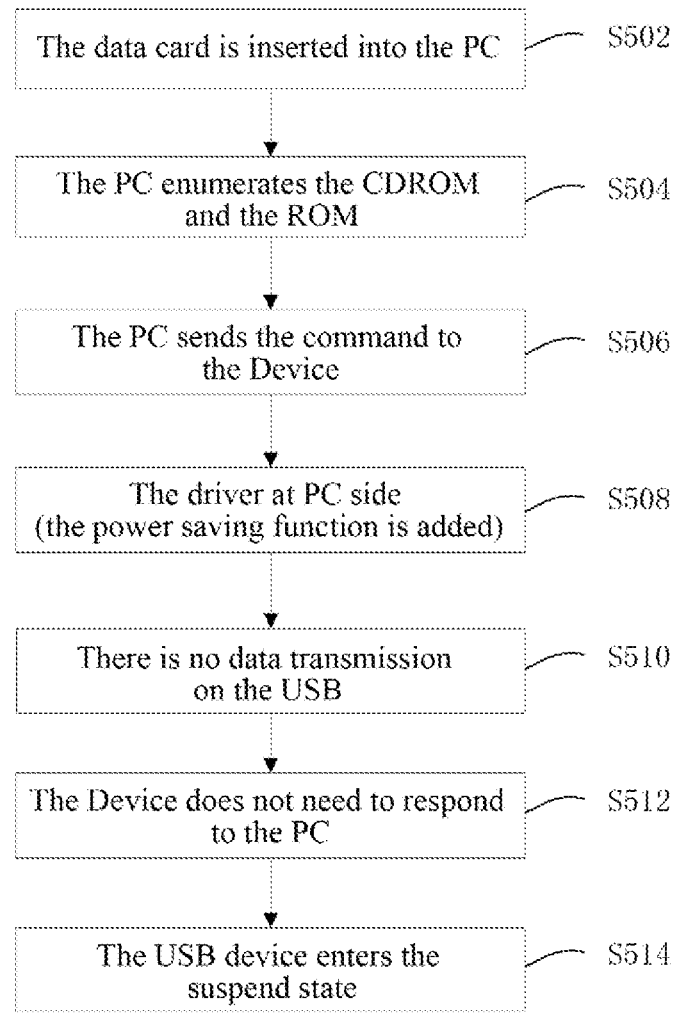
FIG. 5 a process diagram of an interaction between a personal computer and a USB device according to embodiment two of the present invention.

Because the driver of the corresponding device should be installed before using the data card, certainly the process is realized through the device manufacturer CDROM automatically running the software to obtain the type of operating system and the network card protocol, determining whether the data card supports the obtained network card protocol according to the software version of the data card, and finally determining whether to install the driver developed by the manufacturer. In view of this, the present embodiment is realized through the driver of the corresponding USB device. As shown in FIG. 5, the electricity saving method in the present embodiment includes the following steps.

In step S502, the data card is inserted into the PC.

In step S504, the PC enumerates the CDROM, and installs the corresponding drivers at PC side and the internet access software automatically; the user pops up the CDROM manually, and the PC enumerates the CDROM and the COM port again. At this moment, the installed driver at PC side adds the corresponding USB power saving function.

In step S506, the PC sends the Test Unit Ready command (even if there is no network data transmission) to the Device constantly according to the enumerated CDROM (USB Mass Storage) device.

In step S508, the software at PC side analyzes and responds to the Test Unit Ready command sent by the PC and maintains the shield to the Device, but it does not respond to and intervene in other commands.

In steps S510 and S512, because the device does not receive the command sent by the PC, it will not make the response as well; there is no corresponding data transmission in the USB bus.

In step 514, because there is no data transmission in the USB bus, the PC generates the Suspend, and the USB PHY suspends and enters the power saving mode.

Figure 6:
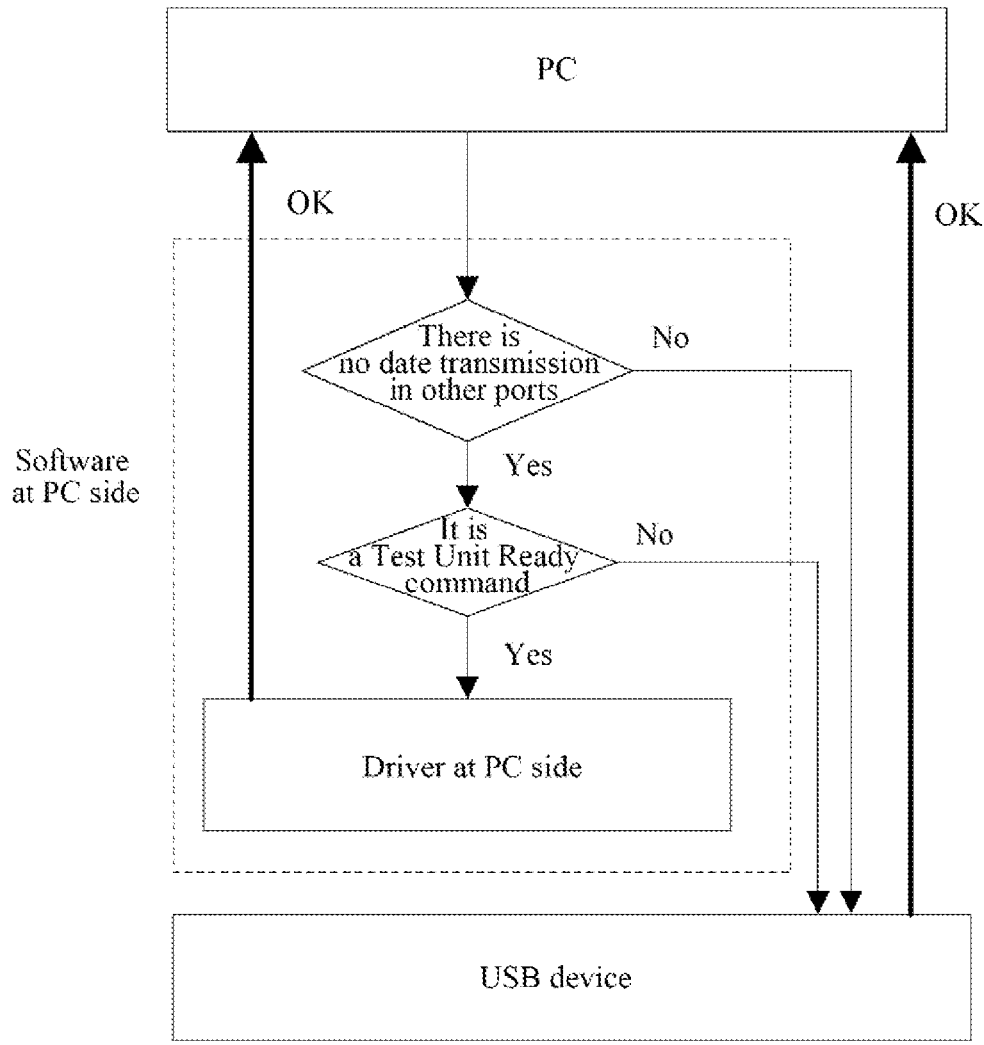
FIG. 6 is a flow chart of processing data by the software at PC side according to embodiment two of the present invention.

In the present embodiment, when there is no data transmission in other channel in the USB bus, the PC will send the Test Unit Ready command to the device constantly as well. As shown in FIG. 6, in the driver at PC side, when analyzing the command, judging that there is no data transmission on other ports and the command sent by the PC is the Test Unit Ready command, the responding is performed on the command, and the command is not sent to the device through USB, which guarantees that the USB can enter the Suspend state when there is no data transmission, thus achieving the objective of power-saving.

In addition, other problems may be caused if the driver at PC side maintains the shield and the automatic response to the command, so the device is woken up when the PC sends the Resume suspend, and the driver at PC side will automatically shut down the response to the Test Unit Ready command, and the device resumes the normal operation; the switchover in the whole process will not influence the use of the user and the correct transmission of the data, but it can reduce the power consumption of system greatly and enable the PC to work longer, and the user experience is better.

On the basis of the above-mentioned technical scheme provided by the present embodiment, the data card with the CDROM can be made to enter the power-saving when there is no necessary data transmission, and there is no need to unload the USB Mass Storage driver. Compared with the related art, the present embodiment can realize keeping the existence of the CDROM during the data card USB power-saving and help the use of the user; and there is no influence to the normal data service, the whole process reduces the power consumption of the device greatly without requiring the user participation and without requiring to change the environment of software and hardware of the device, and the method is simple and easy to be implemented. In the same way, the CDROM is only one form of the mass storage device, and in addition, like the U disk (the USB storage) also can adopt this method to perform the power-saving.

In another embodiment, a software is also provided, and the software is used for performing the technical scheme described in the above-mentioned embodiment and preferable embodiment.

In another embodiment, a storage medium is also provided, and the storage medium stores the above-mentioned software, and the storage medium includes but not limited to: the CD, the floppy disk, the hard disk, the rewritable storage, etc.

Obviously, it can be understood by those skilled in the art that each module or each step above-mentioned in the present document can be implemented by the universal calculating apparatus, and they can be integrated in a single calculating apparatus, or distributed in the network composed of a plurality of calculating apparatus. Alternatively, they can be implemented by the executable program codes of the calculating apparatus. Accordingly, they can be stored in the storage apparatus and implemented by the calculating apparatus, and in some situation, the shown or described steps can be executed according to a sequence different from what is described herein, or they are respectively made into various integrated circuit modules, or a plurality of modules or steps therein are made into the single integrated circuit module to be implemented. In this way, the patent document is not limited to any specific form of the combination of the hardware and software.

The above description is only the preferred embodiments of the present invention and is not intended to limit the patent document. For those skilled in the art, the patent document can have various modifications and variations. All of modifications, equivalents and/or improvements and so on without departing from the spirit and principle of the patent document should be included in the protection scope of the present document.

INDUSTRIAL APPLICABILITY

In the embodiment of the present invention, the technical means, that the host device replaces the USB device to analyze and respond to the detection instruction when the detection instruction used for indicating whether the USB device has already been connected to the host device is detected, is adopted, which solves the technical problems that in the related art, the USB device is unable to suspend which is caused by the host device sending the detection instruction to the USB device continuously and then the power consumption of system is wasted, etc., and therefore saves the power consumption of the USB device, thus reducing the power consumption of the USB data transmission system; and the realization is simple and easy to be popularized.

What is claimed is:

1. An electricity saving method for a universal serial BUS (USB) data transmission system, wherein the USB data transmission system comprises: a USB device and a host device which performs data transmission by using a mass storage protocol with the USB device; and the method comprises:
   the host device detecting a detection instruction sent by the host device to the USB device, wherein the detection instruction is used for detecting whether the USB device has already been connected to the host device;
   in a situation that the detection instruction is detected and there is no specified data transmission between the host device and the USB device, the host device replacing the USB device to analyze and respond to the detection instruction;

when a duration during which there is no data transmission between the host device and the USB device exceeds a predetermined duration, the host device notifying the USB device to suspend.

2. The method according to claim 1, wherein the host device replaces the USB device to analyze and respond to the detection instruction, comprising:

the host device analyzing and responding to the detection instruction through a driver program of the USB device.

3. The method according to claim 2, wherein the USB device is one of the following:

a wireless internet access data card with a read-only memory CDROM, and a USB storage.

4. The method according to claim 1, further comprising:

when detecting that there are data to be transmitted between the host device and the USB device, the host device sending a wakeup instruction to the USB device, wherein the wakeup instruction is used for notifying the USB device to recover the data transmission between the USB device and the host device.

5. The method according to claim 4, wherein the USB device is one of the following:

a wireless internet access data card with a read-only memory CDROM, and a USB storage.

6. The method according to claim 1, wherein the specified data are any data different from the detection instruction.

7. The method according to claim 6, wherein the USB device is one of the following:

a wireless internet access data card with a read-only memory CDROM, and a USB storage.

8. The method according to claim 1, wherein the USB device is one of the following:

a wireless internet access data card with a read-only memory CDROM, and a USB storage.

9. A host device, wherein the host device performs data transmission by using a mass storage protocol with a universal serial BUS (USB) device, and the host device comprises a non-transitory computer readable medium comprising following modules:

a detection module that, when executed on a processor, causes the processor to: detect a detection instruction sent by the host device to the USB device, wherein the detection instruction is used for detecting whether the USB device has already been connected to the host device;

a response module that, when executed on the processor, causes the processor to: in a situation that the detection instruction is detected and there is no specified data transmission between the host device and the USB device, replace the USB device to analyze and respond to the detection instruction;

a notification module that, when executed on the processor, causes the processor to: when a duration during which there is no data transmission between the host device and the USB device exceeds a predetermined duration, notify the USB device to suspend.

10. The host device according to claim 9, wherein the response module, when executed on the processor, further causes the processor to: analyze and respond to the detection instruction through a driver program of the USB device.

11. The host device according to claim 9, the non-transitory computer readable medium further comprising:

a transmitting module that, when executed on the processor, causes the processor to: when the response module detects that there are data to be transmitted between the host device and the USB device, send a wakeup instruction to the USB device, wherein the wakeup instruction is used for notifying the USB device to recover the data transmission between the USB device and the host device;

wherein the response module, when executed on the processor, further causes the processor to: notify the transmitting module to send the wakeup instruction to the USB device when detecting that there are data to be transmitted between the host device and the USB device.

12. The host device according to claim 9, wherein the response module, when executed on the processor, further causes the processor to: in a situation that the specified data are any data different from the detection instruction, replace the USB device to analyze and respond to the detection instruction.

13. A non-transitory computer readable medium, comprising a computer program comprising following modules:

a detection module that, when executed on a processor, causes the processor to: detect a detection instruction sent by a host device to a USB device, wherein the detection instruction is used for detecting whether the USB device has already been connected to the host device;

a response module that, when executed on the processor, causes the processor to: in a situation that the detection instruction is detected and there is no specified data transmission between the host device and the USB device, replace the USB device to analyze and respond to the detection instruction; and a notification module that, when executed on the processor, causes the processor to: when a duration during which there is no data transmission between the host device and the USB device exceeds a predetermined duration, notify the USB device to suspend.

\* \* \* \* \*